(No Model.)

A. DÄHN.
BELT FASTENER.

No. 262,576. Patented Aug. 15, 1882.

Attest:
Charles Pickles
C. M. Hine

Inventor:
Albert Dähn
by C. D. Moody, atty

UNITED STATES PATENT OFFICE.

ALBERT DÄHN, OF DITTMER'S STORE, MISSOURI.

BELT-FASTENER.

SPECIFICATION forming part of Letters Patent No. 262,576, dated August 15, 1882.

Application filed March 16, 1882. (No model.)

*To all whom it may concern:*

Be it known that I, ALBERT DÄHN, of Dittmer's Store, Jefferson county, Missouri, have made a new and useful Improvement in Belt-Fasteners, of which the following is a full, clear, and exact description, reference being had to the annexed drawings, making part of this specification, in which—

Figure 1:
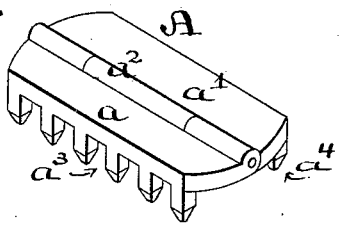
Figure 2:
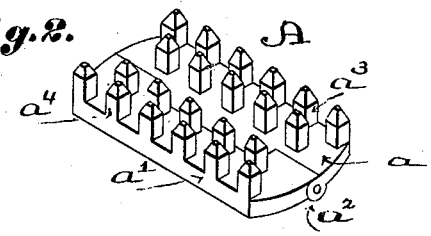
Figure 3:
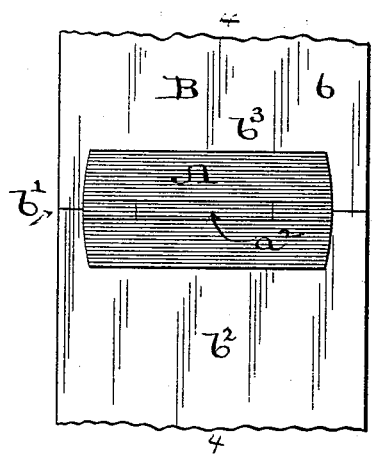
Figure 4:
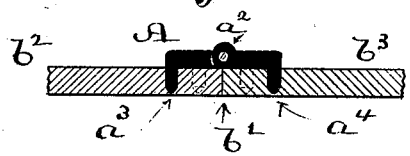

Figure 1 is a view in perspective of the improved fastener; Fig. 2, a bottom view in perspective of the fastener; Fig. 3, a plan showing the fastener attached to a belt; Fig. 4, a section taken on the line 4 4 of Fig. 3, and Fig. 5 a plan showing two of the fasteners in position upon a belt.

The same letters denote the same parts.

The improved fastener consists mainly in a plate having teeth projecting from its under side, the plate being in two parts, hinged together and flat upon the under side, and when the plate is in position the hinge comes over the joint between the two portions of the belt being fastened together, the teeth of one part of the plate engaging in one end of the belt and the teeth in the other part engaging in the opposing end of the belt, and, by reason of the bulge of the hinge being upon the outer surface thereof, enabling the plates to lie flat upon the surface of the belt.

As seen in the drawings, where A represents the plate in question, it is in two parts, $a$ and $a'$, united by the hinge $a^2$, and provided respectively with the teeth $a^3$ and $a^4$. Any desirable number of teeth can be used, and the preferable form of the teeth is that shown, being squared and of uniform cross-section, saving at the point, and of sufficient length to extend well into the belt.

In attaching the fastener the plate A is placed upon the outside, $b$, of the belt B, and so as to bring the hinge $a^2$ over the joint $b'$ between the ends $b^2$ $b^3$ of the belt. Then, and without previously perforating the leather to receive the teeth, the plate is forced against the belt and so as to embed the teeth therein, as shown, the teeth $a^3$ entering the end $b^2$, and the teeth $a^4$ entering the end $b^3$. The result is the ends $b^2$ $b^3$ are thoroughly tied together. The jointing of the plate by means of the hinge $a^2$ prevents the plate from working loose from the belt, which might occur if the plate were a single rigid piece. As it is, however, the plate bends with and follows the belt as the latter passes around the pulley, and the connection of the teeth with the ends $b^2$ $b^3$ is not strained.

Figure 5:
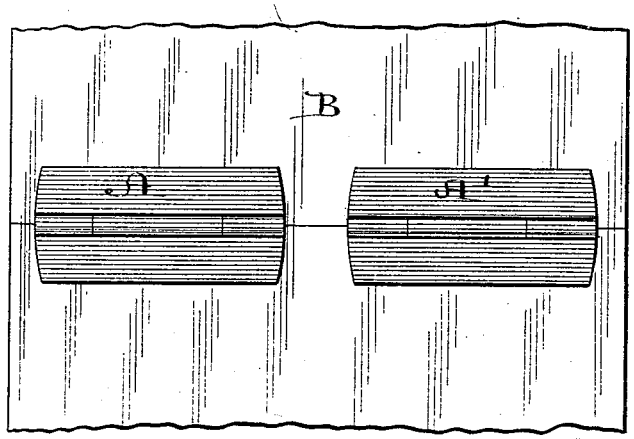

When a wide belt is being united the fastener can be applied as shown in Fig. 5—that is, two (A A') or more plates can be used upon the same belt.

I claim—

An improved belt-fastener, consisting of the centrally-hinged plates provided with downwardly-projecting teeth upon each side of the hinge, said plates having a flat surface upon the side from which the teeth project, with the bulging hinge upon the opposite side, substantially as set forth.

Witness my hand this 7th day of March, 1882.

ALBERT DÄHN.

Witnesses:
 M. V. FRAGSTEIN,
 CHARLES PICKLES.